United States Patent
Mihm (10) Patent No.: US 10,300,880 B2
(45) Date of Patent: May 28, 2019

(54) VEHICLE AIRBAG SYSTEMS AND METHODS WITH MAGNETIC ELEMENTS

(71) Applicant: GM GLOBAL TECHNOLOGY OPERATIONS LLC, Detroit, MI (US)

(72) Inventor: Russell J. Mihm, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/599,123

(22) Filed: May 18, 2017

(65) Prior Publication Data

US 2018/0334130 A1 Nov. 22, 2018

(51) Int. Cl.
*B60R 21/013* (2006.01)
*B60R 21/207* (2006.01)
*B60R 21/214* (2011.01)
*B60R 21/232* (2011.01)
*B60R 21/233* (2006.01)
*B60R 21/2334* (2011.01)

(52) U.S. Cl.
CPC ........ *B60R 21/2334* (2013.01); *B60R 21/013* (2013.01); *B60R 21/207* (2013.01); *B60R 21/214* (2013.01); *B60R 21/232* (2013.01); *B60R 21/233* (2013.01)

(58) Field of Classification Search
CPC . B60R 21/2334; B60R 21/013; B60R 21/207; B60R 21/214; B60R 21/232; B60R 21/233
See application file for complete search history.

(56) References Cited

U.S. PATENT DOCUMENTS

| | | | | |
|---|---|---|---|---|
| 10,023,145 | B1* | 7/2018 | Rivera | B60R 21/207 |
| 2011/0018245 | A1* | 1/2011 | Hatfield | B60R 21/232 |
| | | | | 280/743.2 |
| 2011/0272928 | A1* | 11/2011 | Czach | B60R 21/232 |
| | | | | 280/730.2 |
| 2016/0082917 | A1* | 3/2016 | Slaats | B60R 21/232 |
| | | | | 280/730.2 |
| 2016/0236636 | A1* | 8/2016 | Rao | B60R 21/235 |
| 2017/0355342 | A1* | 12/2017 | Deng | B60R 21/231 |

OTHER PUBLICATIONS

K & J Magnetics, Inc. Neodymium Block Magnet Product Details. Retrieved from https://www.kjmagnetics.com/proddetail.asp?prod=BY0X02SH.
K & J Magnetics, Inc. Cylinder Magnet Product Details. Retrieved from https://www.kjmagnetics.com/proddetail.asp?prod=DC4SH.

\* cited by examiner

*Primary Examiner* — Drew J Brown
(74) *Attorney, Agent, or Firm* — Lorenz & Kopf LLP (57) ABSTRACT

An airbag module for a vehicle includes an airbag cushion; an inflator coupled to the airbag cushion and configured to selectively provide air to inflate and deploy the airbag cushion from a stowed state into a deployed state; an airbag magnetic element coupled to the airbag cushion; and a magnetic guide element arranged at a distance to the airbag magnetic element when the airbag cushion is in the stowed state. Upon deployment of the airbag cushion, the airbag magnetic element and the magnetic guide element magnetically interact with one another to at least one of guide the airbag cushion in a predetermined direction or maintain the airbag cushion in a predetermined deployed position.

20 Claims, 10 Drawing Sheets

VEHICLE AIRBAG SYSTEMS AND METHODS WITH MAGNETIC ELEMENTS

TECHNICAL FIELD

The present disclosure generally relates to vehicle airbag systems, and more particularly relates to vehicle airbag systems and methods with magnetic elements.

BACKGROUND

Airbags (or inflatable restraint devices) are standard equipment on most vehicles. In basic airbag system implementations, vehicles are equipped with one or more airbags that deploy from forward-facing regions such as the steering wheel and the passenger side of the instrument panel. In more recent implementations, additional airbags, such as curtain airbags or side-impact airbags, have been employed in different areas of the vehicle. Generally, designers continue to seek improvements to airbag systems in order to enhance performance.

Accordingly, it is desirable to provide improved airbag systems and methods. Furthermore, other desirable features and characteristics of the systems and methods will become apparent from the subsequent detailed description and the appended claims, taken in conjunction with the accompanying drawings and the foregoing technical field and background.

SUMMARY

In one exemplary embodiment, an airbag module for a vehicle includes an airbag cushion; an inflator coupled to the airbag cushion and configured to selectively provide air to inflate and deploy the airbag cushion from a stowed state into a deployed state; an airbag magnetic element coupled to the airbag cushion; and a magnetic guide element arranged at a distance to the airbag magnetic element when the airbag cushion is in the stowed state. Upon deployment of the airbag cushion, the airbag magnetic element and the magnetic guide element magnetically interact with one another to at least one of guide the airbag cushion in a predetermined direction or maintain the airbag cushion in a predetermined deployed position.

In another embodiment, the airbag magnetic element and the magnetic guide element are arranged for mutual magnetic attraction.

In a further embodiment, the airbag magnetic element and the magnetic guide element are arranged such that the mutual magnetic attraction maintains the airbag cushion in the predetermined deployed position.

In yet another embodiment, the airbag magnetic element and the magnetic guide element are arranged to guide the airbag cushion in the predetermined direction.

In another embodiment, the airbag magnetic element and the magnetic guide element are arranged such that the airbag magnetic element is repelled by the magnetic guide element in the predetermined direction.

In a further embodiment, the airbag magnetic element and the airbag cushion are mounted in a seat of the vehicle, and the magnetic guide element is mounted in a frame element of the vehicle.

In yet another embodiment, the airbag magnetic element and the airbag cushion are mounted in a roof of the vehicle, and the magnetic guide element is mounted in a side frame element of the vehicle.

In another embodiment, the airbag module further includes a retention mechanism with a first portion proximate to the airbag magnetic element and a second portion proximate to the magnetic guide element. Upon deployment, the first and second portions cooperate to mechanically maintain the airbag cushion in the predetermined deployed position.

In a further embodiment, the first portion of the retention mechanism is integrated into the airbag magnetic element, the first portion of the retention mechanism and the airbag magnetic element forming an enlarged section, and the second portion of the retention mechanism is integrated into the magnetic guide element and form an opening and slot that capture the enlarged section to mechanically retain the airbag cushion in the predetermined deployed position.

In yet another embodiment, at least one of the airbag magnetic element or the magnetic guide element is formed with neodymium and induces a pull force of approximately 20 lbs to approximately 130 lbs.

In another embodiment, the airbag magnetic element is secured in a pocket on an outer face of a distal end of the airbag cushion.

In a further embodiment, a vehicle, includes a frame structure forming a cabin, the frame structure including a floor, a roof, and at least two side structures; at least one seat mounted to the floor within the cabin; and an airbag module coupled to at least one of the frame structure or the at least one seat. The airbag module includes an airbag cushion; an inflator coupled to the airbag cushion and configured to selectively provide air to inflate and deploy the airbag cushion from a stowed state into a deployed state; and an airbag magnetic element coupled to the airbag cushion. The vehicle further includes a magnetic guide element coupled to at least one of the frame structure or the at least one seat and arranged at a distance to the airbag magnetic element when the airbag cushion is in the stowed state. Upon deployment of the airbag cushion, the airbag magnetic element and the magnetic guide element magnetically interact with one another to at least one of guide the airbag cushion in a predetermined direction or maintain the airbag cushion in a predetermined deployed position.

In yet another embodiment, the airbag module is mounted on the at least one seat, and the magnetic guide element is mounted on the frame structure.

In another embodiment, the airbag module is mounted on the frame structure, and the magnetic guide element is mounted on the at least one seat.

In a further embodiment, the airbag module and the magnetic guide element are mounted on the frame structure.

In yet another embodiment, one of the airbag module or the magnetic guide element is mounted on the roof of the frame structure and the other one of the airbag module or the magnetic guide element is mounted on the floor of the frame structure.

In another embodiment, the vehicle includes a retention mechanism with a first portion proximate to the airbag magnetic element and a second portion proximate to the magnetic guide element. Upon deployment, the first and second portions cooperate to mechanically maintain the airbag cushion in the predetermined deployed position.

In a further embodiment, at least one of the airbag magnetic element or the magnetic guide element is formed with neodymium and induces a pull force of approximately 20 lbs to approximately 130 lbs.

In yet another embodiment, a method is provided for operating an airbag module in a vehicle. The method includes collecting, with at least one sensor, environmental condition information; evaluating, with a controller, the environmental condition information for a predetermined event; inflating, upon detection of the predetermined event, an airbag cushion of the airbag module with an inflator; and guiding the airbag cushion with an airbag magnetic element arranged on the airbag cushion relative to a magnetic guide element via magnetic interaction.

In another embodiment, the method further includes mechanically retaining, upon the guiding of the airbag cushion, the airbag magnetic element relative to the magnetic guide element with a retention mechanism.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
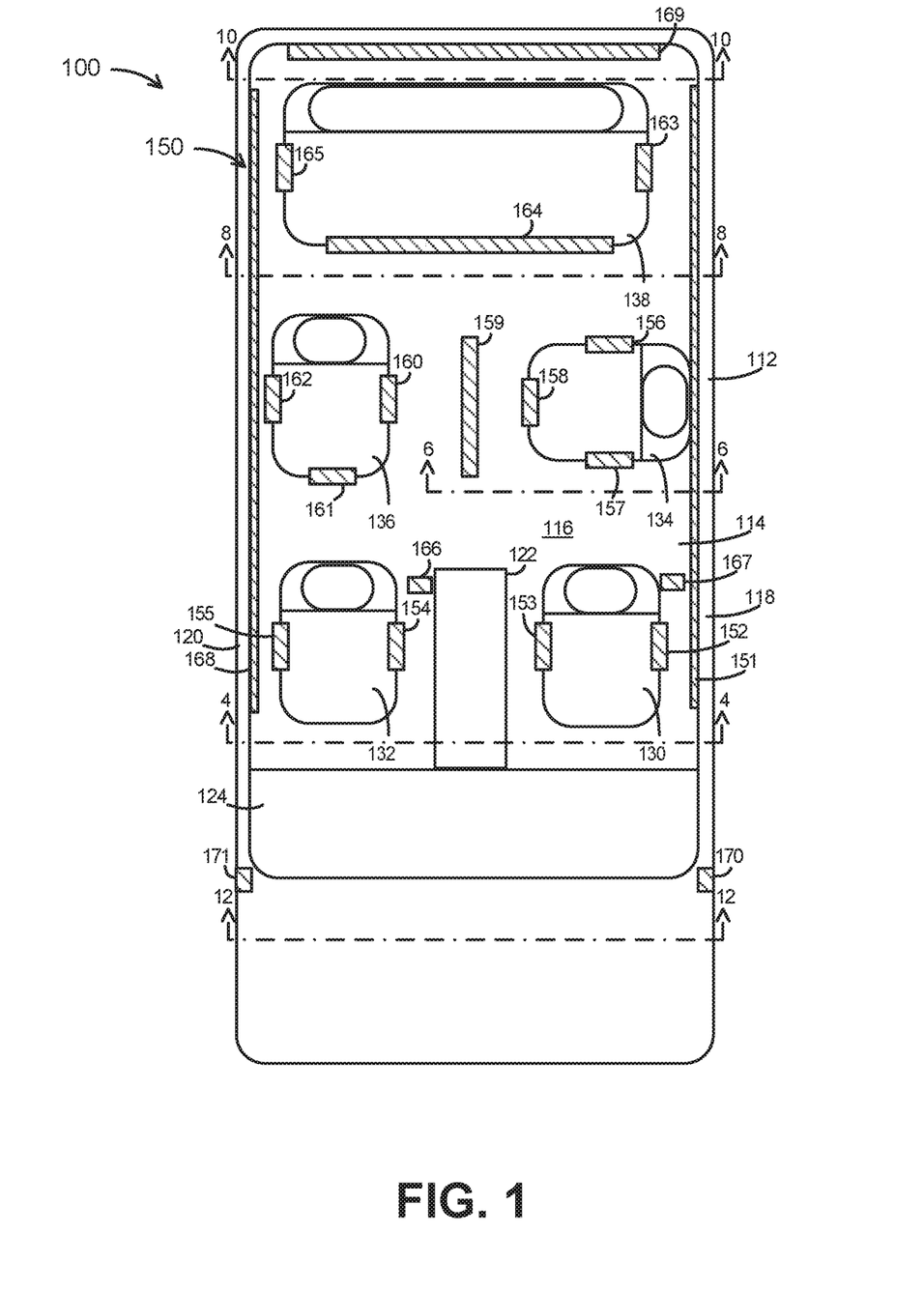
FIG. 1 is a block diagram of a vehicle with an airbag system in accordance with an exemplary embodiment.

FIG. 1 is a schematic representation of an airbag system 150 implemented in a vehicle 100 in accordance with an exemplary embodiment. The vehicle 100 is depicted in the illustrated embodiment as a passenger car, but it should be appreciated that any other vehicle, including trucks, sport utility vehicles (SUVs), recreational vehicles (RVs), marine vessels, aircraft, etc., can also be used. In one embodiment, the vehicle 100 is an autonomous vehicle that is automatically controlled to carry passengers from one location to another, although the vehicle 100 may also be a manually operated vehicle As depicted in FIG. 1, the vehicle 100 generally includes various structural elements that make up a body or frame 112 arranged on a chassis (not shown) to substantially enclose the components of the vehicle 100. Although not shown, the vehicle 100 generally includes a propulsion system, a transmission system, a steering system, and a brake system, as well as data storage devices, vehicle controller, and communication system. Operation of these components is generally understood and will not be discussed in greater detail.

Typically, the body 112 encloses a cabin 114 and may include elements such as a floor 116, doors (e.g., doors 118, 120), windows (not shown), windshield (not shown), center console 122, dashboard 124, roof 126 (FIG. 4), and other elements typical of a vehicle 100. One or more seats 130, 132, 134, 136, 138 are positioned within the cabin 114 to support the driver and/or passengers. Any seating arrangement may be provided. However, in the depicted embodiment, the vehicle 100 includes a front driver seat 130, a front passenger seat 132, left and right middle seats 134, 136, and a rear bench seat 138. Generally, seats 130, 132, 136, 138 have forward-facing orientations. However, other seat orientations may be provided, as demonstrated by the side-facing orientation of seat 134 or angled seat orientations (not shown). As also depicted in FIG. 1, the center console 122 may positioned between the front driver and passenger seats 130, 132. Additional structural and function details about the vehicle 100 may be introduced below.

The vehicle 100 additionally includes the airbag system 150 formed by one or more airbag modules 151-171 placed throughout the vehicle 100. The particular locations of the airbag modules 151-171 may vary and the arrangement in FIG. 1 is presented merely as one example. Generally, the airbag modules 151-171 function to protect the occupants, cargo, and/or pedestrians by activating an airbag cushion from a collapsed or stowed state into a deployed state.

In the depicted embodiment, the airbag system 150 includes a driver-side roof rail (or curtain) airbag module 151, a driver-side outboard airbag module 152, and a driver-side inboard airbag module 153 associated with the front driver seat 130. The airbag system 150 further includes a passenger-side inboard airbag module 154 and a passenger-side outboard airbag module 155 associated with the front passenger seat 132.

The airbag system 150 further includes left, right, and front edge airbag modules 156, 157, 158 associated with the left middle seat 134. The airbag system 150 also includes a center open-area airbag module 159 in between the left and right middle seats 132, 134. The airbag system 150 further includes left, right, and front edge airbag modules 160, 161, 162 associated with the right middle seat 136. The airbag system 150 also includes left, right, and front edge airbag modules 163, 164, 165 associated with the bench seat 138. The airbag system 150 also includes roof-mounted passenger and driver side airbag modules 166, 168 and a rear window airbag module 169. Finally, in the depicted embodiment, the airbag system 150 also includes exterior airbag modules 171, 172 mounted on the A-pillars of the vehicle 100. Generally, the configuration of FIG. 1 is merely an example, and one or more of the modules 151-171 may be omitted and/or additional modules may be added. Additional airbag modules may be introduced below.

As is generally understood, each seat (e.g., seat 130, 132, 134, 136, 138) includes a horizontal lower portion or seat bottom and an upper portion or seat back that extends upward from the rear end of the seat bottom. The seat bottom may be coupled to the vehicle 100 with a mounting system that allows the vehicle seat to be moved (e.g., fore/aft, lateral, up/down, etc.). Each of the seat bottom and the seat back includes a supporting frame. A cushion, such as a foam pad, may be coupled to the frame and a trim cover may surround the cushion.

As noted above, the seats 130, 132, 134, 136, 138 may be configured to include airbag modules (e.g., modules 151-171) within the seat back and/or bottom, such as within and/or under the cushion and trim cover. The airbag modules may be coupled directly to the seat frame with a mounting device, such as a mounting bracket, fastener, or plate. As also noted above, the modules 200 may be mounted on other portions of the body 112, such as the roof 126, floor 116, and/or exterior. As conditions warrant, the airbag cushion of the module 200 inflates and is driven away from the respective mounting location to limit the lateral, forward, or rearward movement of the occupant. Additional examples are provided below.

Figure 2:
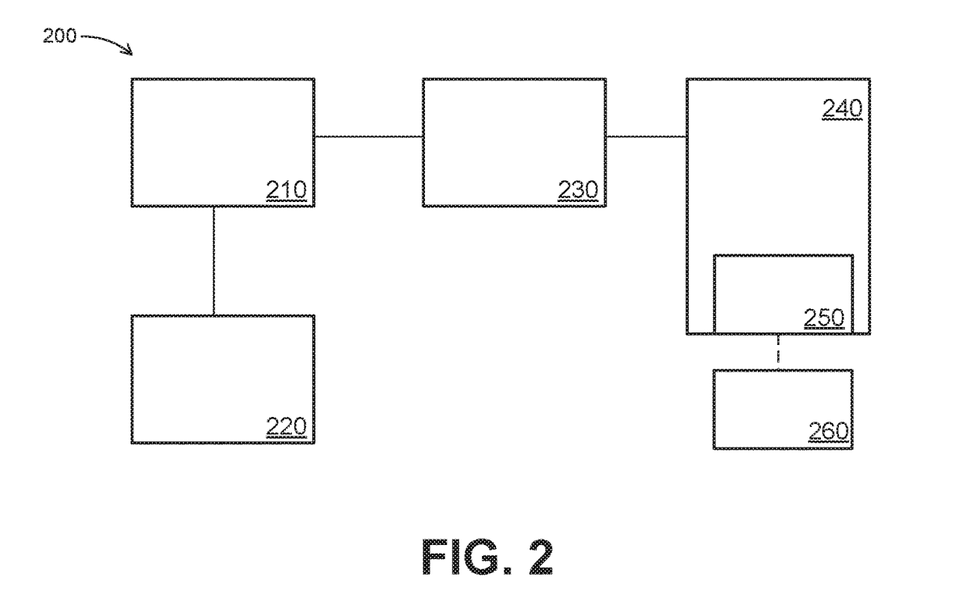
FIG. 2 is a schematic functional block diagram of an airbag module of the airbag system of FIG. 1 in accordance with an exemplary embodiment.

Reference is briefly made to a schematic functional block diagram of an airbag module of the airbag system 150 of FIG. 1 in accordance with an exemplary embodiment. Generally, the airbag module 200 may represent any of the airbag modules discussed herein, including airbag modules 151-171 discussed above.

In one exemplary embodiment, the airbag module 200 may be considered to include a controller 210, one or more sensors 220, an inflator 230, and an airbag cushion 240 coupled together in any suitable manner. The airbag module 200 may further be considered to include an airbag magnetic element 250 that forms part of the airbag cushion 240 and a magnetic guide element 260 positioned within the vehicle 100 at a distance from the airbag cushion 240 that interacts with the airbag magnetic element 250.

Generally, each airbag module 200 is configured to sense environmental conditions for the vehicle 100, identify one or more events for the vehicle 100 for which the airbag module 200 is configured to accommodate based on the sensed environmental conditions, and in response to the identified one or more events, selectively actuate the airbag module 200. The airbag module 200 may be mounted in any appropriate location, including the locations discussed above.

In some embodiments, various aspects of the airbag module 200 may be positioned at different locations. For example, the controller 210 and sensors 220 may be arranged in a different location than the inflator 230 and airbag cushion 240. Moreover, multiple airbag modules 200 may share resources. In other words, a controller 210 may operate numerous airbag modules 200, and/or sensors 220 may provide data to numerous airbag modules 200. Further, an inflator 230 may be used to inflate multiple airbag cushions 240.

Generally, the controller 210 may be one or multiple computers including a random access memory (RAM), a read-only memory (ROM) and a processing unit in addition to various input and output connections. The control functions of the controller 210 described herein may be implemented by one or more software programs stored in internal or external memory and are performed by execution by the processing unit. However, some or all of the functions may also be implemented by hardware components. It will be understood that the controller 210 may be implemented as a dedicated controller for controlling a particular airbag module 200, and optionally other airbag modules, or the controller 210 can be embodied in other controllers of the vehicle 100.

As one example and as introduced above, the controller 210 is communicatively coupled to monitor data collected by the sensors 220 associated with environmental conditions. In particular, the controller 210 is configured to identify one or more events for the vehicle 100 for which the airbag module 200 is configured to accommodate based on the environmental conditions for the vehicle 100. The sensors 220 may include pressure sensors configured to sense the application of pressure to the exterior of the vehicle 100. Such pressure sensors 220 may be located in areas of the vehicle body 112, including the front door 118, the rear door 120, and/or in other portions of the vehicle body 112, such as the A-pillar, the B-pillar, or the C-pillar. Additionally, the sensors 220 may include accelerometers or other sensors configured to sense transverse acceleration of the vehicle 100. Further, the sensors 220 may include a gyro sensor or other sensor configured to sense rotation of the vehicle 100 about its longitudinal axis. In some embodiments, the controller 210 may receive signals from other sources, such as other vehicle systems or sensors outside of the module 200.

In one exemplary embodiment, the sensors 220 may collect additional information, including information about the occupant. For example, the sensors 220 may include weight or pressure sensors that detect the presence of an occupant in the seat, thereby enabling actuation of the airbag module when an occupant is present and preventing actuation of the airbag module with there is no occupant. As another example, the sensors 220 may include pressure, proximity, or other type of sensors that determine the orientation and/or position of the occupant in the seat (e.g., the size of the occupant, which way the occupant is facing, head position of the occupant relative to body structures, and/or whether the occupant is sitting upright or lying down). This information may be useful to determine which airbag module (or modules) 200 to activate.

Upon detection of an event, the controller 210 generates a command signal for the inflator 230. In response, the inflator 230 provides gas or air to the airbag cushion 240. Generally, airbag cushion 240 is an inflatable structure that is initially in a stowed or collapsed state. In the stowed state, the airbag cushion 240 of the airbag module 200 may be hidden from view within the interior of the vehicle 100. The airbag cushion 240 may be folded, rolled, or otherwise compressed into the stowed state prior to deployment.

Upon being inflated by the air from the inflator 230, the airbag cushion 240 is inflated into the deployed state. Specifically, the airbag cushion 240 has one or more internal inflatable chambers which are inflated by the selective rapid introduction of inflation gas. The inflation causes any covering to be displaced, thereby exposing the cushion 240 to the cabin 114 of the vehicle 100.

As described in greater detail below, an airbag magnetic element 250 is incorporated into the airbag cushion 240 and cooperates with the magnetic guide element 260 mounted at a distance from the initial position of the airbag cushion 240. When the airbag cushion 240 is inflated into the deployed state, the airbag cushion 240 may be sized such that the airbag magnetic element 250 incorporated into the airbag cushion 240 is proximate to the magnetic guide element 260 mounted to the frame structure or other element.

Each of the airbag magnetic element 250 and the magnetic guide element 260 may be any type of magnetic element. Typically, each element 250, 260 may itself be a magnet, for instance, or may be a material otherwise magnetically attracted to magnets (e.g., a ferromagnetic material). In some examples, the elements 250, 260 may be permanent magnets configured to continuously produce a magnetic field, and in other examples, one or both of the elements 250, 260 may be electromagnets configured for the selective production of a magnetic field As one example, one or both of the elements 250, 260 may be formed with neodymium magnets, which generally may be able to withstand repeated shock loads. As another example, the one or both of the elements 250 may be a formed with a "super high" temperature material that maintains magnetic properties up to 150° C. and may induce a pull force from approximately 20 lbs to approximately 130 lbs. Generally, at least the airbag magnetic element 250 is selected for a strong relative strength relative to enhanced cushioning rigidity, as discussed below. As examples, the airbag magnetic element 250 may be in the form of magnetic bars (e.g., approximately 2"×1"×⅛") or discs (e.g., approximately ¾" diameter×¼" thickness), and the magnetic guide element 260 may have similar sizes and/or shapes.

Typically, airbag magnetic element 250 is oriented relative to the magnetic guide element 260 such that the magnetic fields interact (e.g., to magnetically interact) to guide and/or retain the airbag cushion 240 in a predetermined desired position. For example, the elements 250, 260 may be oriented (e.g., with aligned opposite poles) such that, when the airbag magnetic element 250 contacts or is in close proximity to the magnetic guide element 260, the elements 250, 260 are magnetically attracted to one another to guide deployment of the airbag cushion 240 and/or to maintain a deployed position of the airbag cushion 240. In some instances, the airbag magnetic element 250 and the magnetic guide element 260 are oriented with respective magnetic fields such that the magnetic guide element 260 repels the airbag magnetic element 250 in a different direction into a desired position. Generally, in the discussion below, unless otherwise noted, the airbag magnetic element 250 and the magnetic guide element 260 are subject to attraction forces.

Although FIG. 2 depicts a single airbag magnetic element 250 and magnetic guide element 260, each airbag cushion 240 may include multiple airbag magnetic elements 250 that cooperate with multiple magnetic guide elements 260. As described in greater detail below, this cooperation tends to guide and/or maintain the airbag cushion 240 in a desired protective position. Although exemplary components of the airbag module 200 are described, aspects of the airbag module 200 may be omitted and/or combined with other airbag modules, and/or additional elements may be provided.

Figure 3:
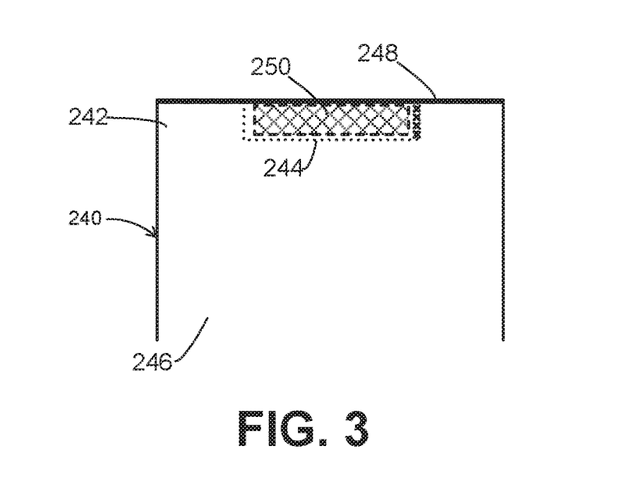
FIG. 3 is a partial schematic representation of an airbag cushion that may be incorporated into the airbag module of FIG. 2 in accordance with an exemplary embodiment.

Reference is briefly made to FIG. 3, which is a partial schematic representation of an airbag cushion 240 that may be incorporated into the airbag module 200 of FIG. 2 in accordance with an exemplary embodiment. The airbag cushion 240 may include panels 246 that form an inflatable chamber via an inflation aperture. The panels 246 define periphery portions to result in an inflated cushion having a predetermined size and shape. The material properties of the panels 246 have permeability to inflation gas and may be selected, for example, to allow the inflatable chamber to maintain a surface tension conducive to providing, among other things, support for occupant contact. As shown, the respective panels 246 are connected to one another at a distal periphery portion by a seam 248 and are attached to the body element of the vehicle 100 with an attachment (not shown). The attachment may be implemented with a fastener, and the seam 248 can be implemented with sewing, stitching, adhesive, hook and loop type fasteners, staples, grommets and/or rivets, as examples.

The airbag magnetic element 250 may be positioned at or proximate to the surface of the panel 246, generally facing the direction of deployment. FIG. 3 particularly depicts a distal end 242 of the airbag cushion 240 in which a pocket 244 has been provided to house and/or retain the airbag magnetic element 250. As noted above, other mounting or retention mechanisms may be provided.

In other examples, the airbag magnetic element 250 may be enclosed by the airbag cushion 240 or incorporated into the material of the panels 246. In some implementations, the airbag magnetic element 250 may be sewed, stitched, welded, adhered or otherwise connected with the airbag cushion 240. In other implementations, the airbag magnetic element 250 may be applied to the airbag cushion 240 by spraying or printing, for example. In further embodiments, a pocket for the airbag magnetic element 250 may be formed by folding over a cushion edge selvage; sewing a close-out line beneath the magnetic substance; sewing lines to form a pocket; placing the magnetic element inside; and sewing a close-out line. As noted below, the airbag magnetic element 250 may be arranged with a predetermined orientation (e.g., North/South ends) to provide the desired behavior during deployment. In any of the above described examples and implementations, the airbag magnetic element 250 may be rigid, for instance, or flexible so as to adapt in shape to the contours of the cooperating magnetic guide element 260.

In some examples, the airbag magnetic element 250 may additionally include a retention feature, such as a "lock-ball" feature or similar configuration, that mates with a corresponding feature at the magnetic guide element 260. At least one such example is discussed below.

FIGS. 4-13 depict examples of airbag modules (e.g., airbag modules 151-171 and/or module 200) in stowed and deployed states. Although FIGS. 4-13 provide specific examples of module implementation, exemplary embodiments may be incorporated into any suitable area of the vehicle 100.

Figure 4:
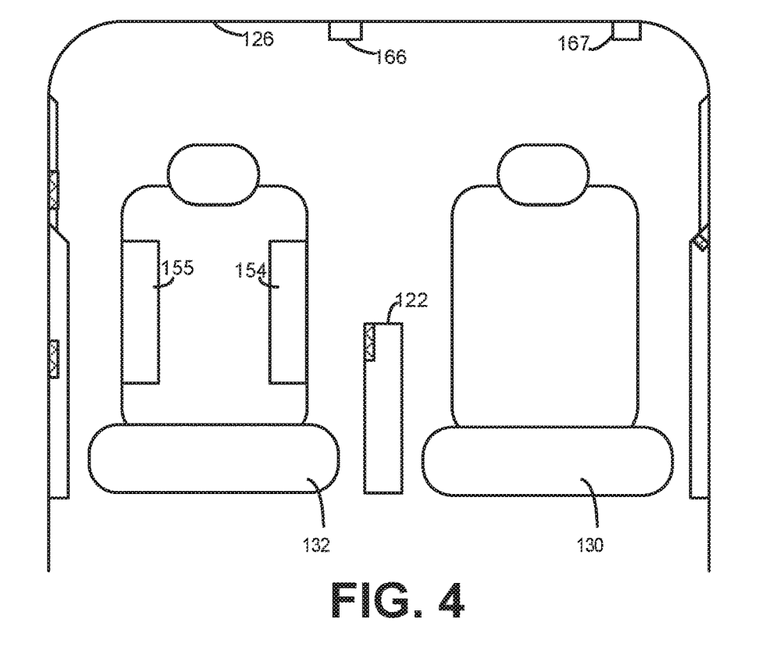
FIG. 4 is a schematic cross-sectional view of the vehicle through line 4-4 of FIG. 1 that includes one or more airbag modules in a stowed state in accordance with an exemplary embodiment.

FIG. 4 is a cross-sectional view of the vehicle 100 through line 4-4 of FIG. 1. In particular, FIG. 4 depicts the front driver seat 130, the front passenger seat 132, and center console 122. FIG. 4 also depicts example airbag modules 154, 155 associated with the front passenger seat 132. In this view, the airbag system 150 further includes a first ceiling airbag module 166 arranged over the front passenger seat 132 and second ceiling airbag module 167 arranged over the front driver seat 130. In FIG. 4, the airbag cushions associated with the depicted airbag modules 154, 155, 166, 167 are in the stowed positions. Although only aspects of airbag modules 154, 155, 166, 167 are discussed below, each airbag module 154, 155, 166, 167 may generally include one or more of the elements of airbag module 200 discussed above in reference to FIG. 2.

Figure 5:
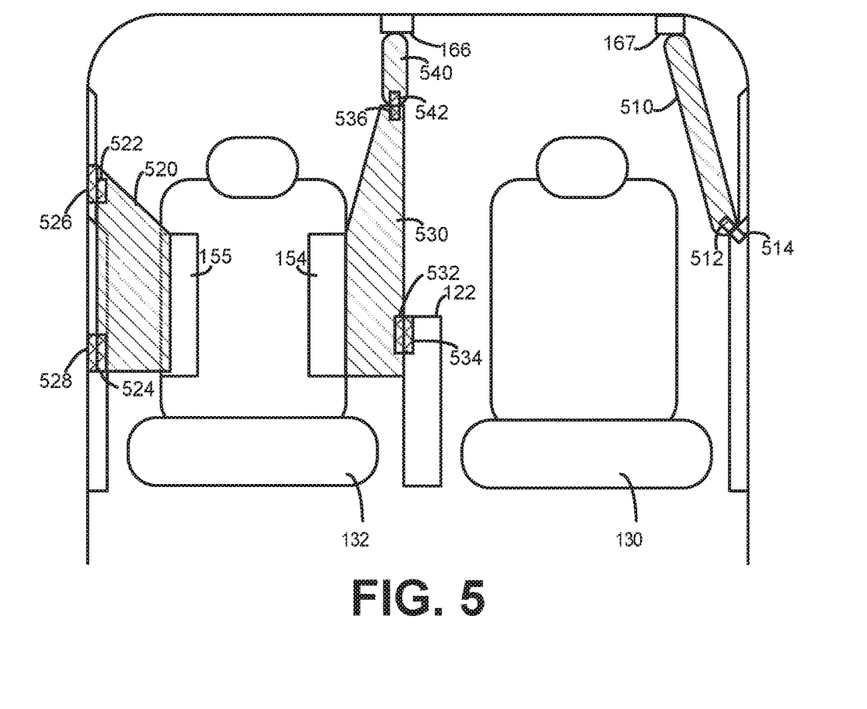
FIG. 5 is the schematic cross-sectional view of FIG. 4 with the airbag modules in the deployed state in accordance with an exemplary embodiment.

FIG. 5 the same cross-sectional view as FIG. 4 in which the airbag modules 154, 155, 166, 167 have been activated. As an example, airbag module 167 includes an airbag cushion 510 that has been inflated. In this example, the airbag module 167 is a side curtain airbag module that functions to mitigate any contact of the occupant with the window or frame-side. As shown, the airbag cushion 510 includes an airbag magnetic element 512 that cooperates with a magnetic guide element 514 mounted on the frame side (e.g., on a door). In this manner, the airbag cushion 510 is retained in a desired or optimal position to protect the occupant.

As a further example, airbag module 155 includes an airbag cushion 520 that has been inflated. In this example, the airbag module 167 is an outboard seat airbag module that functions to mitigate any objects or occupants from passing between the seat 132 and the frame side (or door). As shown, the airbag cushion 520 includes two airbag magnetic elements 522, 524 that respectively cooperate with two magnetic guide elements 526, 528 mounted on the frame side (e.g., on a door). In this manner, the airbag cushion 520 is retained in a desired or optimal position to protect the occupants.

As a further example, airbag module 154 and airbag module 166 have inflatable cushions 530, 540 that cooperate with one another. In particular, the cushion 530 of the airbag module 154 may include a first magnetic element 532 that engages a magnetic guide element 534 positioned in the center console. The cushion 530 of the airbag module 154 may further include a second magnetic element 536 that engages an airbag magnetic element 542 within airbag cushion 540 of airbag module 166. In effect, the airbag magnetic element 542 of airbag cushion 540 is a magnetic guide element from the perspective of module 154, and vice versa. In this manner, the airbag modules 154, 166 function to mitigate any objects or occupants from passing between the seat 132 and the center console 122.

Figure 6:
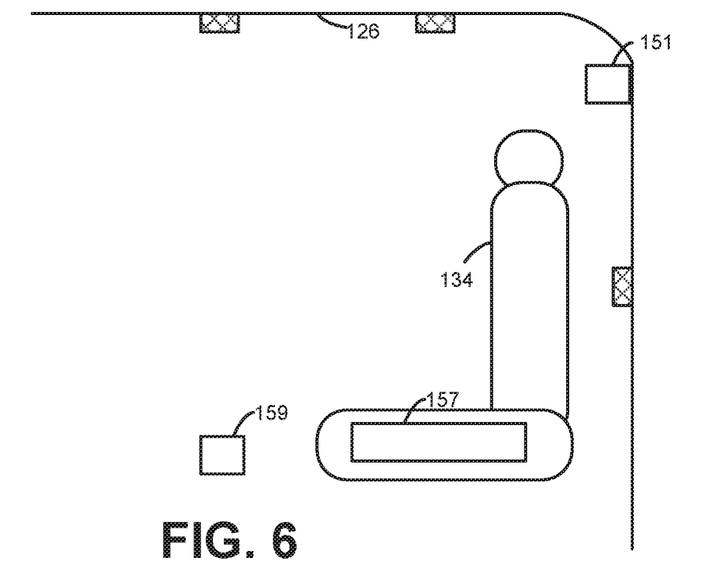
FIG. 6 is a schematic cross-sectional view of the vehicle through line 6-6 of FIG. 1 that includes one or more airbag modules in a stowed state in accordance with an exemplary embodiment.

FIG. 6 is a cross-sectional view of the vehicle 100 through line 6-6 of FIG. 1. In particular, FIG. 6 depicts the side-facing middle seat 134. FIG. 6 also depicts example airbag modules 157, 159 associated with the side-facing middle seat 134 and the roof rail airbag module 151 that extends along the length of the vehicle 100. In FIG. 6, the airbag cushions associated with the depicted airbag modules 151, 157, 159 are in the stowed positions. Although only aspects of airbag modules 151, 157, 159 are discussed below, each airbag module 151, 157, 159 may generally include one or more of the elements of airbag module 200 discussed above in reference to FIG. 2.

Figure 7:
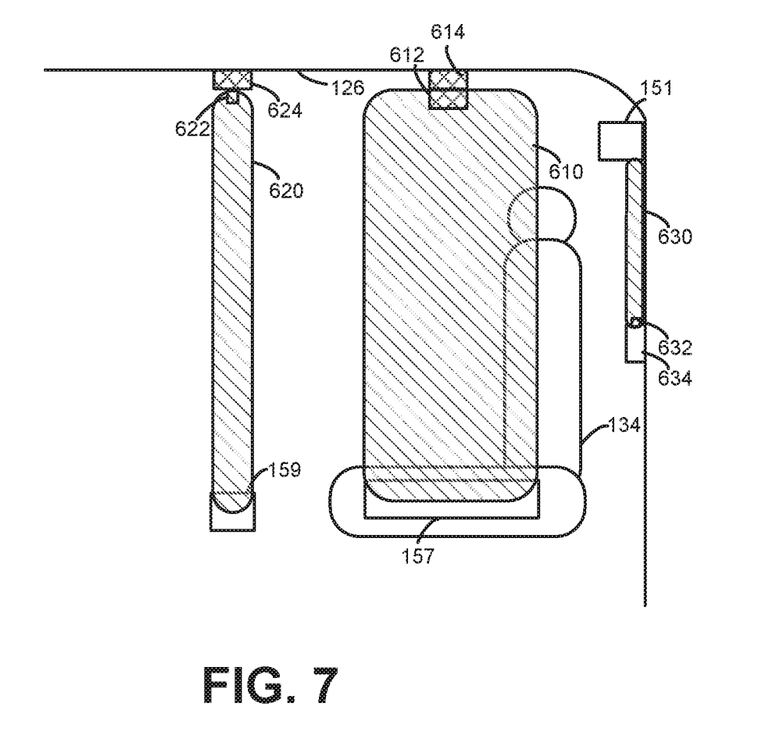
FIG. 7 is the schematic cross-sectional view of FIG. 6 with the airbag modules in the deployed state in accordance with an exemplary embodiment.

FIG. 7 the same cross-sectional view as FIG. 6 in which the airbag modules 151, 157, 159 have been activated. As an example, airbag module 157 includes an airbag cushion 610 that has been inflated. In this example, the airbag module 157 is a side airbag module that functions to mitigate forward movement of the occupant. As shown, the airbag cushion 610 includes an airbag magnetic element 612 that cooperates with a magnetic guide element 614 mounted on the roof 126. In this manner, the airbag cushion 610 is retained in a desired or optimal position to protect the occupant.

As a further example, airbag module 159 includes an airbag cushion 620 that has been inflated. In this example, the airbag module 159 is a free-area airbag module that functions to mitigate any objects or occupants from lateral or cross-car movement. As shown, the airbag cushion 620 includes an airbag magnetic element 622 that cooperates with a magnetic guide element 624 mounted on the roof 126. In this manner, the airbag cushion 620 is retained in a desired or optimal position to protect the occupants.

Additionally, airbag module 151 includes an airbag cushion 630 that has been inflated. As shown, the airbag cushion 630 includes an airbag magnetic element 632 that cooperates with a magnetic guide element 634 mounted on the side of the interior. In this manner, the airbag cushion 630 is retained in a desired or optimal position to protect the occupants.

Figure 8:
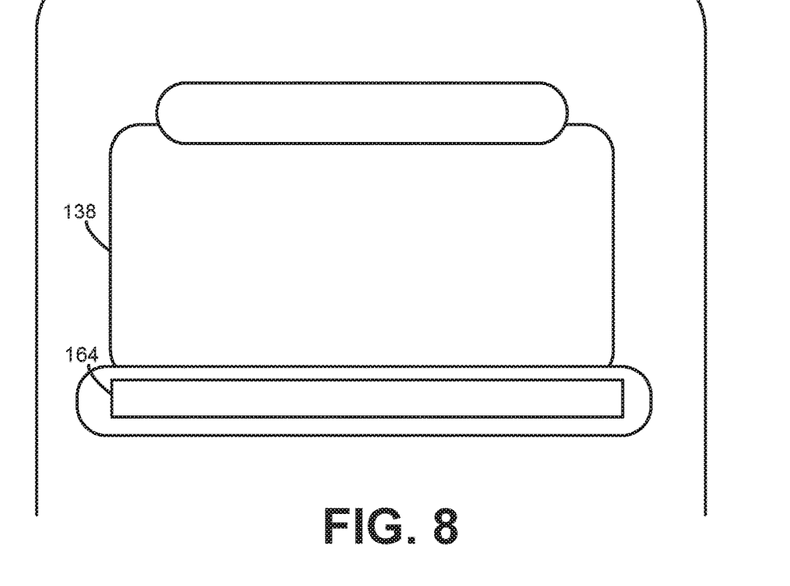
FIG. 8 is a schematic cross-sectional view of the vehicle through line 8-8 of FIG. 1 that includes an airbag module in a stowed state in accordance with an exemplary embodiment.

FIG. 8 is a cross-sectional view of the vehicle 100 through line 8-8 of FIG. 1. In particular, FIG. 8 depicts a bench seat 138. FIG. 8 also depicts example airbag module 164 associated with the bench seat 138. In FIG. 8, the airbag cushion associated with the depicted airbag module 164 is in the stowed positions. Although only aspects of airbag module 164 are discussed below, the airbag module 164 may generally include one or more of the elements of airbag module 200 discussed above in reference to FIG. 2.

Figure 9:
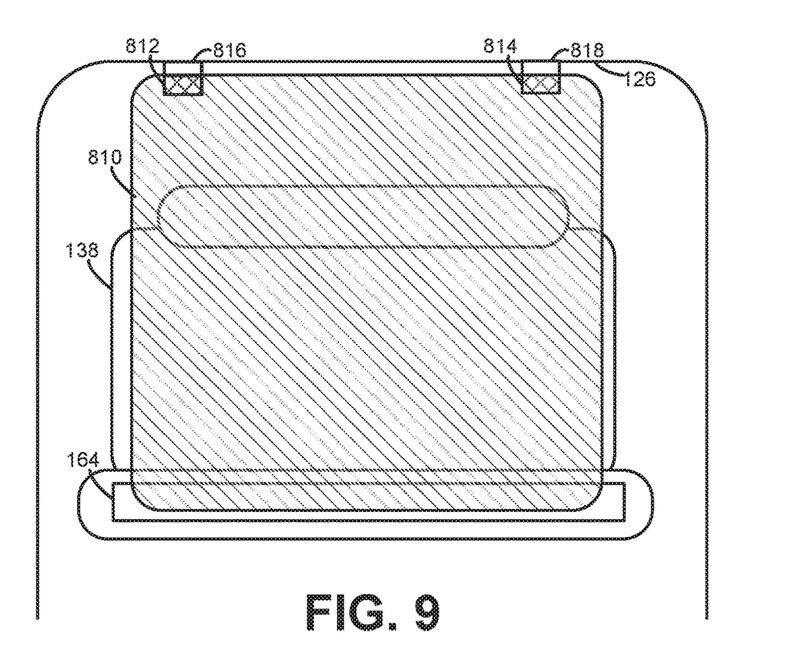
FIG. 9 is the schematic cross-sectional view of FIG. 8 with the airbag module in the deployed state in accordance with an exemplary embodiment.

FIG. 9 the same cross-sectional view as FIG. 8 in which the airbag module 164 has been activated. As an example, airbag module 164 includes an airbag cushion 810 that has been inflated. In this example, the airbag module 164 is a forward airbag module that functions to mitigate forward movement of the occupant. As shown, the airbag cushion 810 includes two airbag magnetic elements 812, 814 that cooperate with corresponding magnetic guide elements 816, 818 mounted on the roof 126. In this manner, the airbag cushion 810 is retained in a desired or optimal position to protect the occupant.

Figure 10:
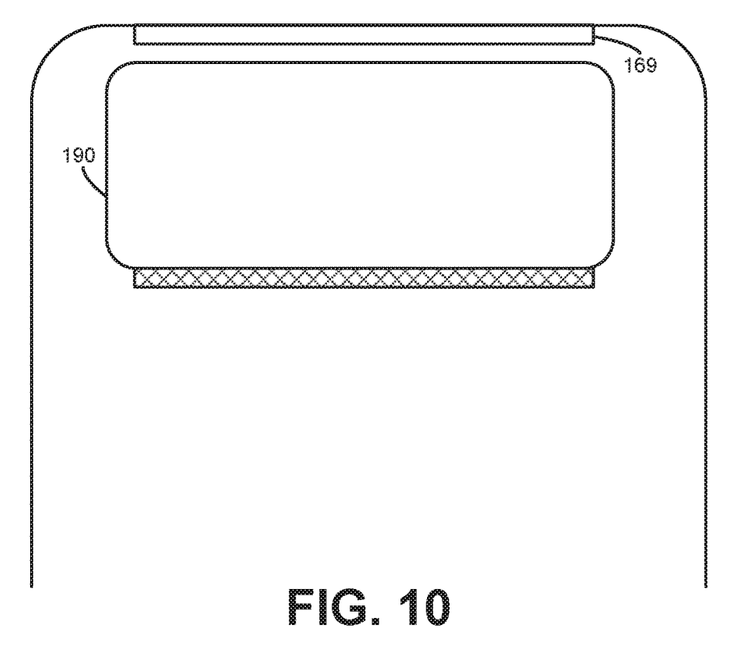
FIG. 10 is a schematic cross-sectional view of the vehicle through line 10-10 of FIG. 1 that includes an airbag module in a stowed state in accordance with an exemplary embodiment.

FIG. 10 is a schematic cross-sectional view of the vehicle 100 through line 10-10 of FIG. 1. In particular, FIG. 10 depicts a rear window 190 behind the bench seat 138 (FIG. 1). FIG. 10 also depicts airbag module 169 associated with the rear window 190. In FIG. 10, the airbag cushion associated with the depicted airbag module 169 is in the stowed positions. Although only aspects of airbag module 169 are discussed below, the airbag module 169 may generally include one or more of the elements of airbag module 200 discussed above in reference to FIG. 2.

Figure 11:
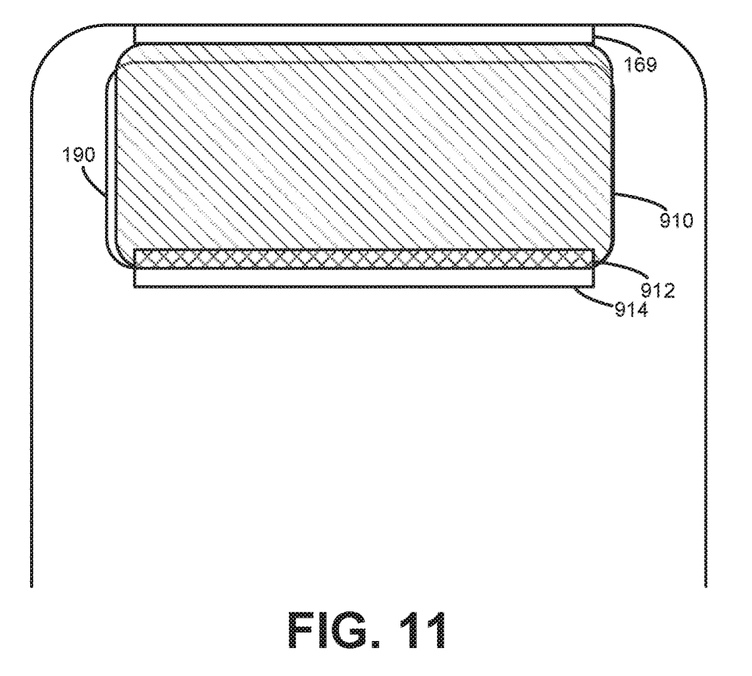
FIG. 11 is the schematic cross-sectional view of FIG. 10 with the airbag module in the deployed state in accordance with an exemplary embodiment.

FIG. 11 the same cross-sectional view as FIG. 10 in which the airbag module 169 has been activated. As an example, airbag module 166 includes an airbag cushion 910 that has been inflated. In this example, the airbag module 169 functions to protect the rear window 190. As shown, the airbag cushion 910 includes an airbag magnetic element 912 that cooperates with corresponding magnetic guide element 914 on the sill of the rear window 190. In this manner, the airbag cushion 910 is retained in a desired or optimal position.

Figure 12:
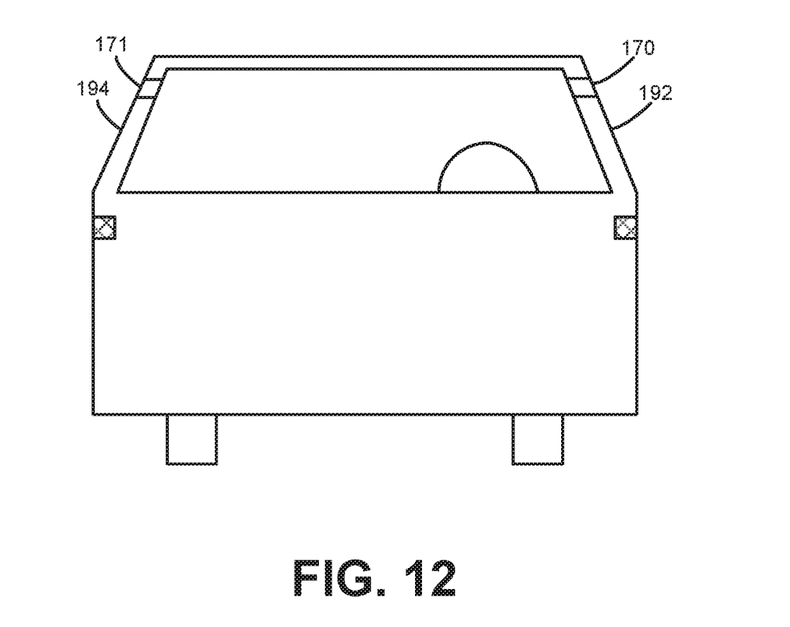
FIG. 12 is a schematic cross-sectional view of the vehicle through line 12-12 of FIG. 1 that includes an airbag module in a stowed state in accordance with an exemplary embodiment.

FIG. 12 is a schematic cross-sectional view of the vehicle 100 through line 12-12 of FIG. 1. In particular, FIG. 12 depicts the A-pillars 192, 194 on either side of the front windshield. FIG. 12 also depicts example airbag modules 170, 171 associated with the A-pillars 192, 194. In FIG. 12, the airbag cushions associated with the depicted airbag modules 170, 171 are in the stowed positions. In this embodiment, the airbag modules 170, 171 may be considered exterior airbags that are mounted on the exterior of the vehicle 100. Although only aspects of airbag module 166 are discussed below, the airbag modules 170, 171 may generally include one or more of the elements of airbag module 200 discussed above in reference to FIG. 2.

Figure 13:
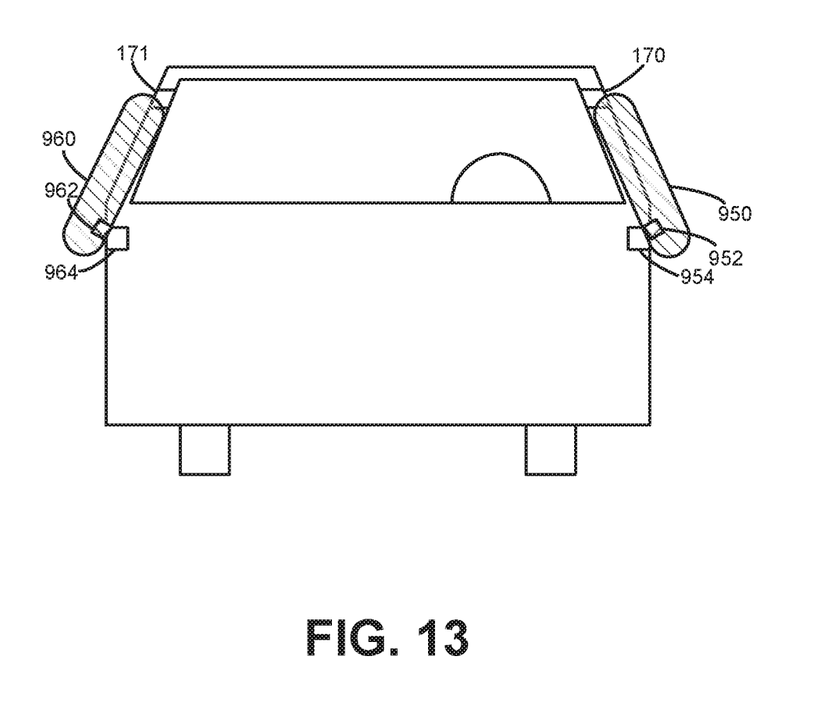
FIG. 13 is the schematic cross-sectional view of FIG. 12 with the airbag module in the deployed state in accordance with an exemplary embodiment.

FIG. 13 the same cross-sectional view as FIG. 12 in which the airbag modules 170, 171 have been activated. As an example, airbag modules 170, 171 include airbag cushions 950, 960 that have been inflated. In this example, the airbag module 170, 171 functions to protect the exterior of the vehicle 100, as well as pedestrians. As shown, the airbag cushions 950, 960 include airbag magnetic elements 952, 962 that cooperate with corresponding magnetic guide elements 954, 964 on other exterior portions of the vehicle 100, such as the hood or side of the vehicle 100. In this manner, the airbag cushions 950, 960 are retained in desired or optimal positions. Although not shown, airbag modules and cooperating magnetic guide elements may be mounted in other exterior locations around the vehicle 100.

In one exemplary embodiment, the airbag magnetic elements described above may retain the associated airbag cushion only with mutual magnetic attraction forces. However, in some embodiments, additional and/or alternative retention arrangements may be provided. One such example is discussed with reference to FIGS. 14-16.

Figure 14:
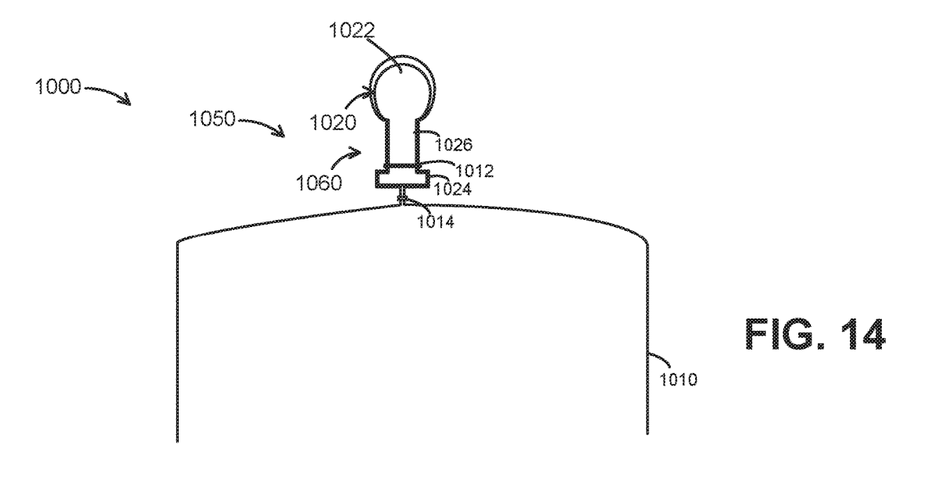
FIG. 14 is a partial cross-sectional view of a first portion of a retention mechanism of an airbag module in accordance with an exemplary embodiment.

FIG. 14 is a partial cross-sectional view of an airbag portion 1060 of a retention mechanism 1050 associated an airbag module 1000 in accordance with an exemplary embodiment. In FIG. 14, only a portion of the airbag module 1000 is depicted. In particular, one end of the airbag cushion 1010 is provided. As above, an airbag magnetic element 1020 is incorporated and/or integrated into one end of the airbag cushion 1010. In this embodiment, the end of the airbag cushion 1010 is configured to secure the airbag magnetic element 1020. For example, the airbag magnetic element 1020 may have a first enlarged section 1022, which in this embodiment is shaped like a ball, and a second enlarged section 1024, which in this embodiment is a flange. For example, the airbag cushion 1010 may be "pinched" or otherwise narrowed by first and second seals 1012, 1014 to secure the position of the airbag magnetic element 1020 at the end of the airbag cushion 1010. A neck section 1026 may be arranged in between the enlarged sections 1022, 1024. In any event, upon deployment, the first enlarged section 1022 of the airbag magnetic element 1020 is oriented towards the magnetic guide element 1070, an example of which is depicted in FIG. 15.

Figure 15:
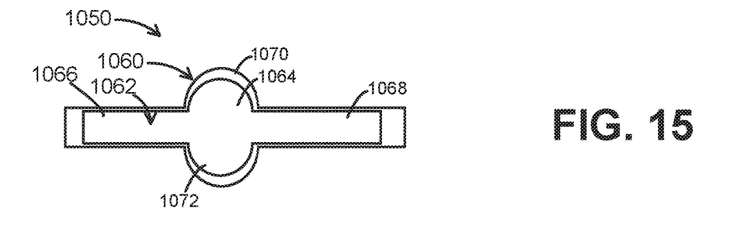
FIG. 15 is a plan cross-sectional view of a second portion of a retention mechanism associated with an airbag module in accordance with an exemplary embodiment.

As shown in FIG. 15, the magnetic guide element 1070 may be integrated into a receiving portion 1060 of the retention mechanism 1050 that cooperates with the airbag portion 1050 discussed above. In one embodiment, the receiving portion 1060 may be formed as a slot 1062 with an enlarged opening 1064 and narrowed side sections 1066, 1068. Generally, the slot 1062 sized such that the enlarged opening 1064 has a diameter that is greater than the diameter of the enlarged section 1022 and the narrowed side sections 1066, 1068 have widths that are smaller than the enlarged section 1022. In one embodiment, the enlarged opening 1064 has a smaller diameter than the diameter of the flange enlarged section 1024. The magnet element 1070 (FIG. 16) may be incorporated into the edges of the slot 1062, particularly the enlarged opening 1064, or on the base structure 1072 (FIG. 16) of the receiving portion 1060 of the retention mechanism.

Figure 16:
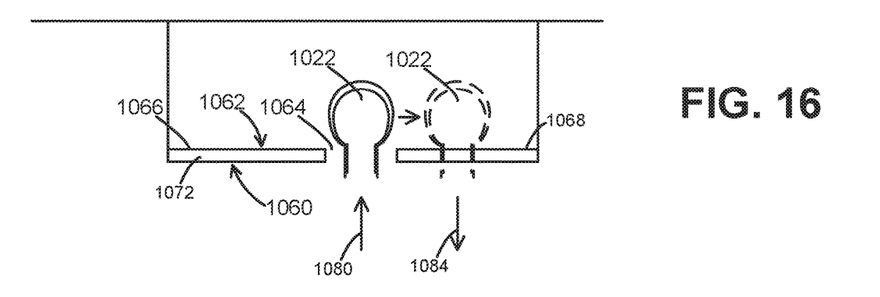
FIG. 16 is a partial cross-sectional view of the retention mechanism of FIGS. 14 and 15 in accordance with an exemplary embodiment.

Accordingly, and as shown in the cross-sectional view of FIG. 16, the enlarged portion 1022 of the airbag magnetic element 1020 may be initially directed through the enlarged opening 1064 of the slot 1062, e.g., in a normal direction 1080 in the view of FIG. 16. The section 1022 of the airbag magnetic element 1020 may be guided through the enlarged opening 1064 of the slot 1062 as a result of magnetic attraction. Subsequently, as depicted in dashed lines, lateral movement of the airbag cushion (i.e., in direction 1082), and thus airbag magnetic element 1020, results in movement of the enlarged section 1022 of the airbag magnetic element 1020 along one of the narrowed side sections 1066, 1068 of the slot 1062. The relative sizes of the enlarged section 1022 of the airbag magnetic element 1020 and the narrowed side section 1066 functions to retain the airbag magnetic element 1020 (and associated airbag cushion) in the opposite normal direction 1084.

The airbag modules described herein may have respective cushions stowed in any suitable manner. Examples of airbag modules 1300, 1400 in the stowed state are depicted in the partial, schematic cross-sectional views of FIGS. 17 and 18. Generally, the airbag modules 1300, 1400 may represent any of the airbag modules discussed above.

Figure 17:
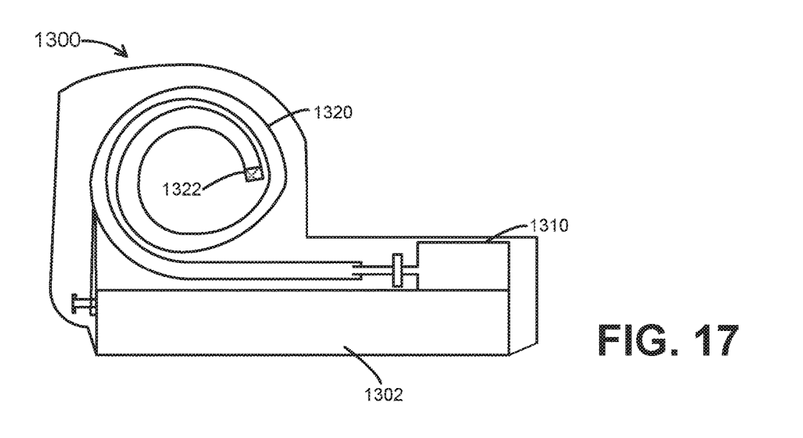
FIG. 17 is a partial, schematic cross-sectional view of an airbag module in a stowed state in accordance with an exemplary embodiment.
Figure 18:
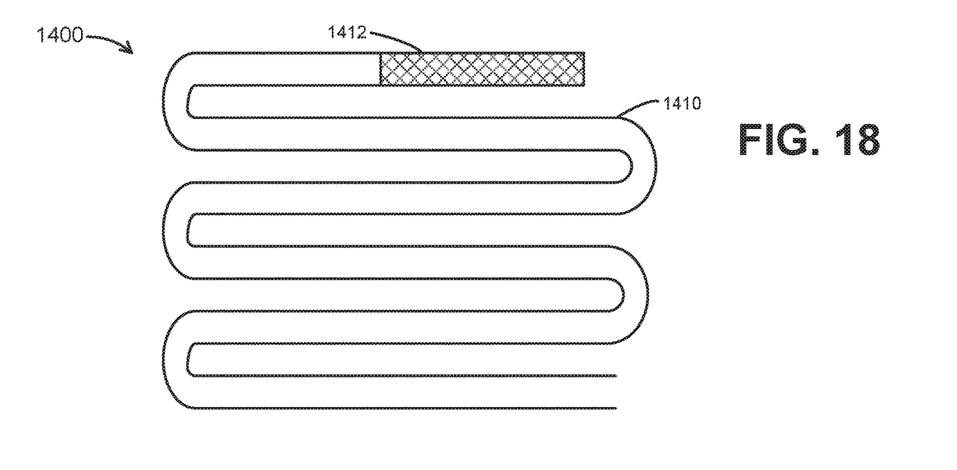
FIG. 18 is a partial, schematic cross-sectional view of an airbag module in a stowed state in accordance with another exemplary embodiment.

As shown in FIG. 17, the airbag module 1300 may be mounted on a frame member 1302 of a seat or other appropriate structure. The depicted portions of the airbag module 1300 include an inflator 1310 configured to provide air or gas to an airbag cushion 1320. In this embodiment, the airbag cushion 1320 is arranged in a spiral configuration with the airbag magnetic element 1322 secured at the end. As shown in FIG. 18, the airbag module 1400 may have a cushion 1410 arranged in a serpentine configuration with an airbag magnetic element 1412 secured at the end.

Figure 19:
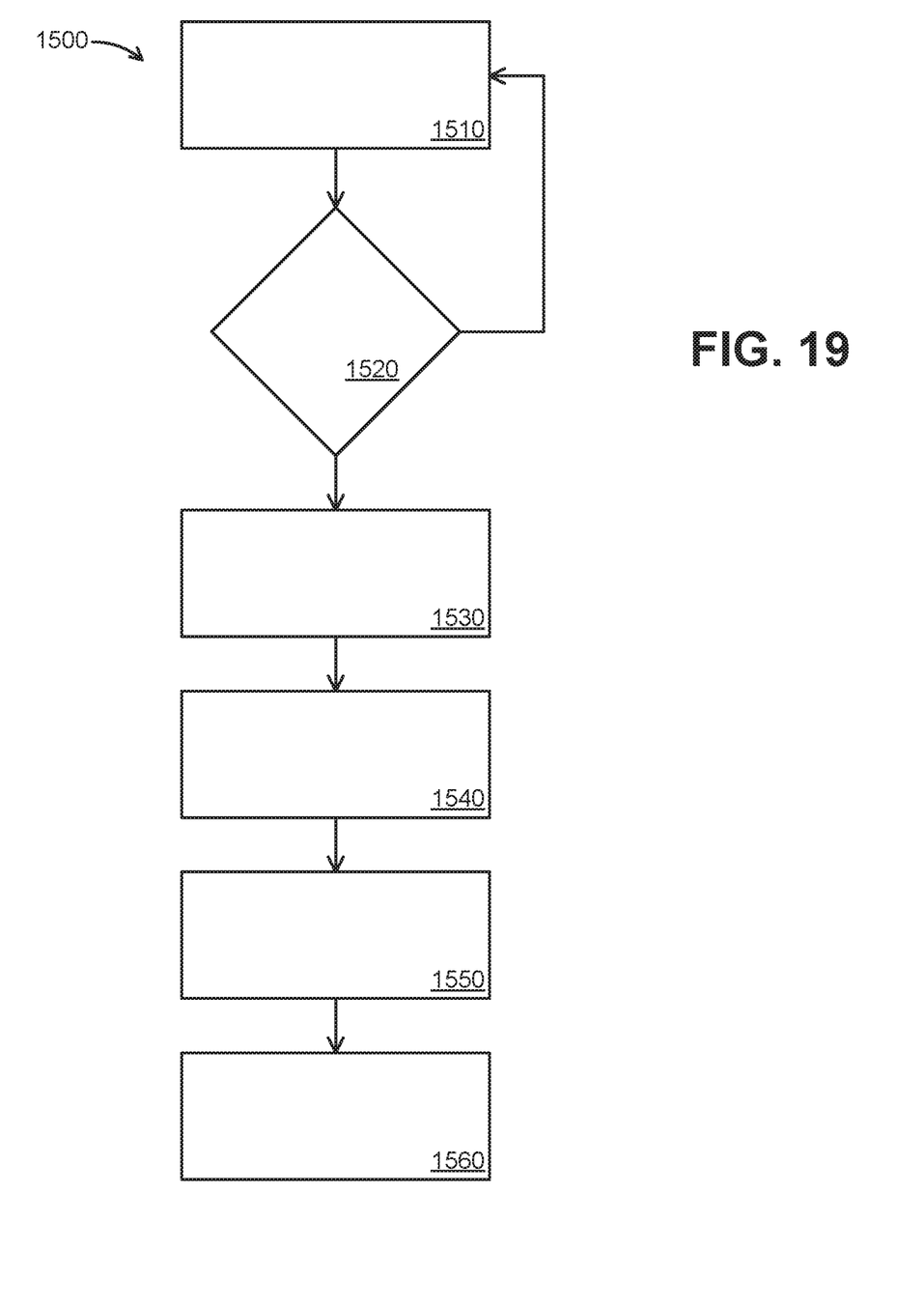
FIG. 19 is a flowchart illustrating an operational scenario for operating an airbag module in accordance with an exemplary embodiment.

FIG. 19 depicts a flowchart illustrating operation of any of airbag modules described herein. Generally, in a first step 1510, airbag sensors collect environmental condition information and provide such information to the controller. In a second step 1520, the controller evaluates the environmental condition information for an event for which the airbag module may accommodate. The controller continues to evaluate the environmental condition information until the event is detected, and upon detection of an event, the method 1500 proceeds to step 1530. In a third step 1530, the controller commands the inflator to inflate the airbag cushion, and in step 1540 the inflator implements the command to inflate and deploy the airbag cushion. In step 1550, as the airbag cushion is deployed, the airbag magnetic element of the airbag cushion engages the magnetic guide element of the body, thereby retaining the airbag cushion in an appropriate position. In some embodiments, in a step 1560, a further retention mechanism may function to mechanically retain the airbag cushion relative to the body in the appropriate position. As described above, in some embodiments, the magnetic guide element may be on a second or opposing airbag cushion.

Exemplary embodiments discussed herein may be of particular use in autonomous and other types of vehicles with unconventional seating arrangements, such as couch or bench type seating or side-facing seating, with or without belts. These types of arrangements may be less likely to have a body reaction structure on which to support an airbag cushion. The magnetic elements and retention mechanisms described above function to provide airbag support without requiring a backing body structure. In effect, the magnetic elements are particularly useful for airbag cushions that do not have opposing frame reaction surfaces to transform a freestanding airbag cushion into a more effective energy absorbing "wall".

In some embodiments, exemplary embodiments may result in smaller module packages, thereby reducing vehicle size and weight and increasing available passenger room. Additionally, in view of the additional support and/or rigidity provided by the magnetic elements, the airbag cushions may have smaller sizes and/or operating pressures, thereby enabling smaller and/or lighter inflators and/or the reduction in the number of airbag modules.

A number of possible locations of airbag modules have been discussed above, and any location is possible, including outboard (door-side) seat airbag modules associated with driver and passenger seats; inboard (console-side) seat airbag associated with driver and passenger seats; roof-rail (curtain) airbag modules on both driver and passenger sides; "open-area" airbag modules at locations towards center line of vehicle with no reaction surface (particularly in autonomous or semi-autonomous vehicle with non-standard seating arrangements); bench seating airbag modules, either along the top or bottom of the bench; cargo-storage area and shelving airbag modules; and airbag modules along the exterior A-pillars, such as in a pedestrian protection scenario.

Accordingly, magnetic elements may be incorporated and/or integrated into airbag cushions and cooperating structures to reinforce the position and/or free-standing nature of the inflated airbag cushion. In particular, the deploying airbag cushion may be implemented with a strategically placed magnetic element that is attracted to a strategically placed magnetic element within the vehicle structure at an opposing location to the airbag cushion, and in the alternative, identically faced magnetic elements may be used as a mechanism of avoidance during deployment (e.g., to guide a deploying cushion away from an impending vehicle structure or occupant).

In some embodiments discussed above, the airbag cushion is contained within the seat and is rapidly inflated to deploy upwards towards the vehicle ceiling. Conventional airbag cushions may be undesirably displaced by the occupant during an event. However, the addition of magnetic elements in the airbag cushion may allow the airbag to deploy upwards towards the vehicle roof in which cooperating magnetic elements are embedded and the resulting attraction magnetic forces cause the airbag cushion to become joined to the vehicle roof and form a rigidized pillow-like "wall" to contain occupants and/or cargo. Examples include deployment from a roof to connect to the floor and deployment from the roof and from the floor to connect in the middle of the vehicle.

In addition, the magnetic elements of the cushion may have a grappling hook-type feature that would engage after magnetic attraction has commenced. That is, the magnetic elements may be configured to grab or engage a protruding feature (or vice versa) in the vehicle structure to further enhance the restraint effect of the inflate cushion.

Exemplary embodiments may be utilized in curtain-style airbags and ejection mitigation in which magnetic elements may be embedded in the lower perimeter of the cushion and to join or engage magnetic elements embedded in the vehicle door trim to reinforce the cushion and reduce the amount of head travel past the vehicle window line. Other exemplary embodiments may be used in instances where cushion trajectory is impacts effective restraint. One such example is a far-side impact airbags that may otherwise risk being snagged or caught on the vehicle center console. In this example, far-side airbag cushion may include a North Pole facing magnet and the vehicle center console may include a North Pole facing magnet, thereby inducing the magnets to repel one and other and guide the far-side airbag cushion away from the center console.

As another example, conventional outboard seat mounted airbags (e.g., proximate to the B-pillar/door) tend to deploy in such a manner that they become pulled too far rearward in vehicle. However, magnetic elements in the airbag cushion and inside the armrest of the door trim may result in the deploying airbag being attracted to the door trim for positioning.

Additionally, the exemplary embodiments may be combined with other vehicle structures, depending on module type and intended protection mode. For instance, a far-side inboard seat mounted airbag cushion is intended to both satisfy lateral restraint and head cushioning specifications, and exemplary embodiments enable the airbag cushion to deploy such that the head chamber cushion positions itself adjacent the driver occupant head more quickly for maximum cushioning effect. A magnetic element in the cushion may join with a magnet embedded in the vehicle seat headrest such that, upon deployment and cushion fill, the head chamber region of the cushion is be magnetically attracted to the head rest and close the gap between the driver occupant and cushion.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with interaction the two components or the two components and any additional member being attached to one another. Such joining may be permanent in nature or alternatively may be removable or releasable in nature.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An airbag module for a vehicle, comprising:
   an airbag cushion, wherein the airbag cushion includes a panel on an outer face of a distal end of the airbag cushion that defines a periphery location of the airbag cushion, the panel having a surface forming a pocket within the airbag cushion;
   an inflator coupled to the airbag cushion and configured to selectively provide air to inflate and deploy the airbag cushion from a stowed state into a deployed state;
   an airbag magnetic element coupled to the airbag cushion and disposed within the pocket, at the surface, and facing toward a direction of deployment; and
   a magnetic guide element arranged at a distance to the airbag magnetic element when the airbag cushion is in the stowed state,
   wherein, upon deployment of the airbag cushion, the airbag magnetic element and the magnetic guide element magnetically interact with one another to at least one of guide the airbag cushion in a predetermined direction or maintain the airbag cushion in a predetermined deployed position.

2. The airbag module of claim 1, wherein the airbag magnetic element and the magnetic guide element are arranged for mutual magnetic attraction.

3. The airbag module of claim 2, wherein the airbag magnetic element and the magnetic guide element are arranged such that the mutual magnetic attraction maintains the airbag cushion in the predetermined deployed position.

4. The airbag module of claim 1, wherein the airbag magnetic element and the magnetic guide element are arranged to guide the airbag cushion in the predetermined direction.

5. The airbag module of claim 3, wherein the airbag magnetic element and the magnetic guide element are arranged such that the airbag magnetic element is repelled by the magnetic guide element in the predetermined direction.

6. The airbag module of claim 1, wherein the airbag magnetic element and the airbag cushion are mounted in a seat of the vehicle, and the magnetic guide element is mounted in a frame element of the vehicle.

7. The airbag module of claim 1, wherein the airbag magnetic element and the airbag cushion are mounted in a roof of the vehicle, and the magnetic guide element is mounted in a side frame element of the vehicle.

8. The airbag module of claim 1, further comprising a retention mechanism comprising a first portion proximate to the airbag magnetic element and a second portion proximate to the magnetic guide element, and wherein, upon deployment, the first and second portions cooperate to mechanically maintain the airbag cushion in the predetermined deployed position;
   wherein the first portion of the retention mechanism is integrated into the airbag magnetic element, the first portion of the retention mechanism and the airbag magnetic element forming an enlarged section, and
   wherein the second portion of the retention mechanism is integrated into the magnetic guide element and form an opening and slot that capture the enlarged section to mechanically retain the airbag cushion in the predetermined deployed position.

9. The airbag module of claim 1, wherein at least one of the airbag magnetic element or the magnetic guide element is formed with neodymium and induces a pull force of approximately 20 lbs to approximately 130 lbs.

10. A vehicle, comprising:
    a frame structure forming a cabin, the frame structure including a floor, a roof, and at least two side structures;
    at least one seat mounted to the floor within the cabin;
    an airbag module coupled to at least one of the frame structure or the at least one seat,
    the airbag module including:
       an airbag cushion, wherein the airbag cushion includes a panel on an outer face of a distal end of the airbag cushion that defines a periphery location of the airbag cushion, the panel having a surface forming a pocket within the airbag cushion;
       an inflator coupled to the airbag cushion and configured to selectively provide air to inflate and deploy the airbag cushion from a stowed state into a deployed state; and
       an airbag magnetic element coupled to the airbag cushion and disposed within the pocket, at the surface, and facing toward a direction of deployment; and
    a magnetic guide element coupled to at least one of the frame structure or the at least one seat and arranged at a distance to the airbag magnetic element when the airbag cushion is in the stowed state,
    wherein, upon deployment of the airbag cushion, the airbag magnetic element and the magnetic guide element magnetically interact with one another to at least one of guide the airbag cushion in a predetermined direction or maintain the airbag cushion in a predetermined deployed position.

11. The vehicle of claim 10, wherein the airbag module is mounted on the at least one seat, and the magnetic guide element is mounted on the frame structure.

12. The vehicle of claim 10, wherein the airbag module is mounted on the frame structure, and the magnetic guide element is mounted on the at least one seat.

13. The vehicle of claim 10, wherein the airbag module and the magnetic guide element are mounted on the frame structure.

14. The vehicle of claim 13, wherein one of the airbag module or the magnetic guide element is mounted on the roof of the frame structure and the other one of the airbag module or the magnetic guide element is mounted on the floor of the frame structure.

15. The vehicle of claim 10, further comprising a retention mechanism comprising a first portion proximate to the airbag magnetic element and a second portion proximate to the magnetic guide element, and wherein, upon deployment, the first and second portions cooperate to mechanically maintain the airbag cushion in the predetermined deployed position.

16. The vehicle of claim 10, wherein at least one of the airbag magnetic element or the magnetic guide element is formed with neodymium and induces a pull force of approximately 20 lbs to approximately 130 lbs.

17. A vehicle comprising:
a frame structure forming a cabin, the frame structure including a floor, a roof, and at least two side structures;
at least one seat mounted to the floor within the cabin;
an airbag module coupled to at least one of the frame structure or the at least one seat,
the airbag module including:
an airbag cushion;
an inflator coupled to the airbag cushion and configured to selectively provide air to inflate and deploy the airbag cushion from a stowed state into a deployed state; and
an airbag magnetic element coupled to the airbag cushion, the airbag magnetic element having a diameter; and
a magnetic guide element coupled to at least one of the frame structure or the at least one seat and arranged at a distance to the airbag magnetic element when the airbag cushion is in the stowed state, the magnetic guide element comprising a receiving portion forming a slot comprising:
an enlarged opening that is greater than the diameter of the airbag magnetic element, such that the airbag magnetic element may be initially directed trough the enlarged opening of the slot in a first normal direction as a result of magnetic attraction; and
two narrowed side sections on opposing sides of the enlarged opening, both of the narrowed side sections having a width that is less than the diameter of the airbag magnetic element, such that the airbag magnetic element, and thereby the airbag cushion, is held into place in an opposing normal direction, opposite the first normal direction, with lateral movement of the airbag magnetic element;
wherein, upon deployment of the airbag cushion, the airbag magnetic element and the magnetic guide element magnetically interact with one another to at least one of guide the airbag cushion in a predetermined direction or maintain the airbag cushion in a predetermined deployed position.

18. The vehicle of claim 17, wherein:
the airbag metallic element comprises:
a first magnetic section;
a second magnetic section; and
a neck connecting the first magnetic section and the second magnetic section; and
the enlarged opening allows passage of the first magnetic section, but not the second magnetic section, therethrough.

19. The vehicle of claim 18, wherein:
the first magnetic section has a first diameter;
the second magnetic section has a second diameter; and
the enlarged opening of the magnetic guide element is greater than the first diameter and less than the second diameter.

20. The vehicle of claim 18, wherein:
the first magnetic section comprises a sphere; and
the second magnetic shape comprises a rectangular prism.

* * * * *